Oct. 15, 1968
G. P. BAUMANN ET AL
3,406,201
UREA SYNTHESIS
Filed June 18, 1965
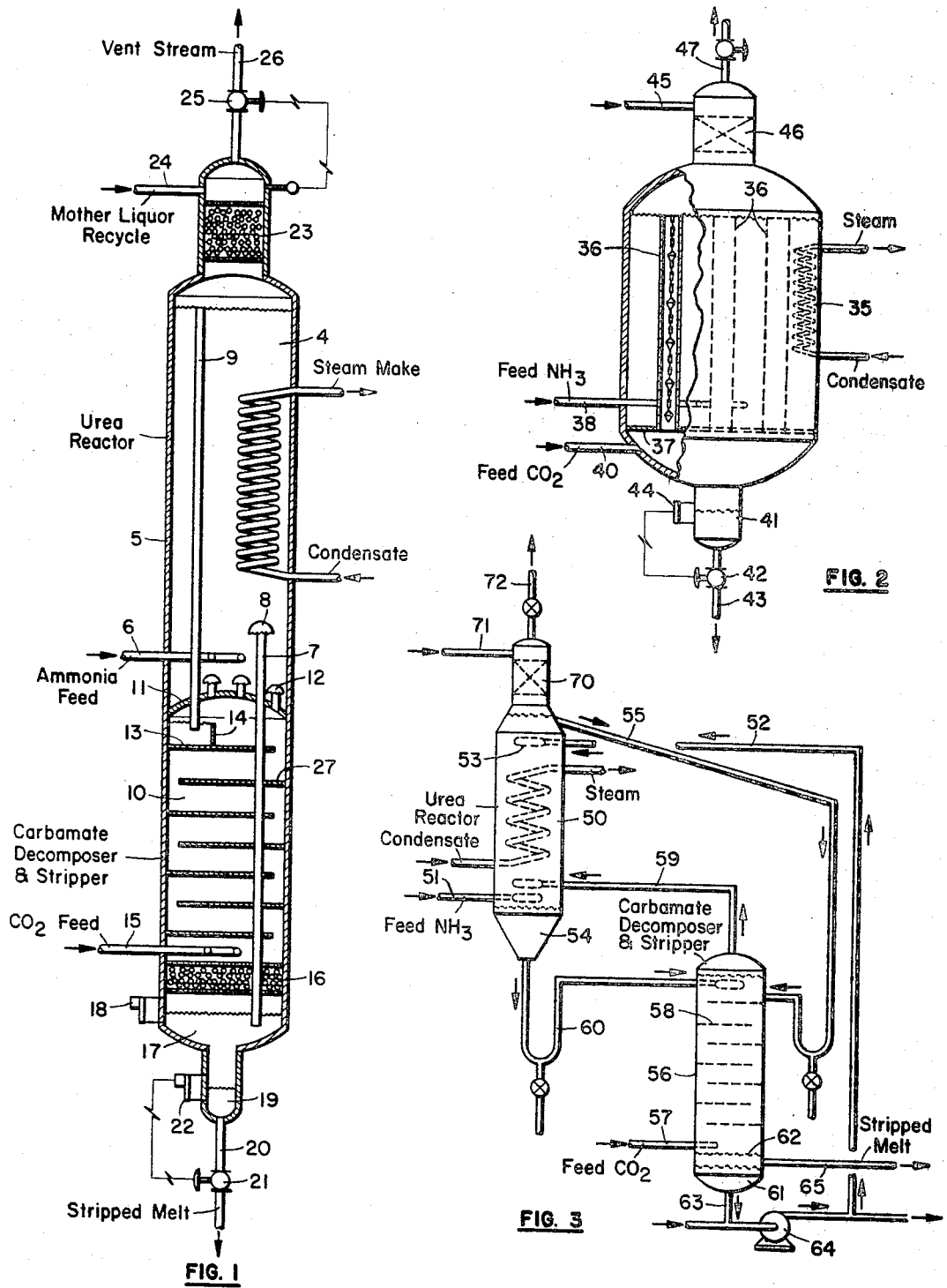
GEORGE P. BAUMANN
MAURICE SPIELMAN       Inventors
By     *Henry Berk*
Patent Attorney

United States Patent Office 3,406,201
Patented Oct. 15, 1968

3,406,201
UREA SYNTHESIS
George P. Baumann, Sparta, and Maurice Spielman, New Providence, N.J., assignors to Esso Research and Engineering Company, a corporation of Delaware
Filed June 18, 1965, Ser. No. 465,058
6 Claims. (Cl. 260—555)

This invention relates to a heat integrated reactor-decomposer system in which an equilibrium limited exothermic reaction occurs in the reaction zone and which employs reactant in a decomposition zone to decompose an intermediate and to strip the gaseous products of decomposition from the decomposition zone. In particular, it relates to a heat integrated reactor-decomposer system which employs feed gas for stripping gaseous products of decomposition and for returning such gaseous products to the reactor with minimized pumping, compression, absorption, reaction and heat exchange apparatus.

Urea synthesis is a classical example of an equilibrium limited exothermic reaction, and many methods have been developed for its commercial production from ammonia and carbon dioxide, such as are described in the ACS Monograph No. 148 (1963) on "The Chemistry and Technology of Fertilizers."

The basic reactions involved in the urea synthesis are reversible:

$$2NH_3 + CO_2 \rightleftarrows \underset{\text{Ammonium Carbamate}}{NH_2COONH_4} \rightleftarrows \underset{\text{Urea}}{NH_2CONH_2} + \underset{\text{Water}}{H_2O}$$

The carbamate intermediate is formed very rapidly from the reactants under elevated pressures. It decomposes slowly to urea and water via the equilibrium limited reaction shown. The reactions are carried out commercially between 160° and 210° C. using holding times of 20 to 60 minutes.

The first reaction is exothermic, the second endothermic and the overall reaction is exothermic. Reaction pressure must be maintained above the vapor pressure of the carbamate, or else it will decompose back to initial reactants.

Since the carbamate is not completely converted to water and urea, it is necessary to decompose the carbamate out of the urea-water mixture. It is also desirable to reuse the feedstock values contained in the carbamate intermediate.

Corrosiveness of the reaction mixture, tendency of the carbamate to precipitate as a solid at lowered temperature, and the adverse effect of water on the rate of urea formation all give rise to problems of circulating the reactants and intermediate materials involved.

This invention is designed to obtain a more advantageous decomposition of the carbamate intermediate and stripping of the reaction products by one of the reactants, i.e., quickly after the urea product is formed by quicker heat transfer in the reactor-decomposer zones, by faster mass transfer between these zones using heat evolved in the reaction zone for the decomposition, and by speedier separation of the decomposition products.

Desired objects of controlling the heat and mass transfer rates with reduction of equipment requirements are now shown to be achieved with certain modifications which include use of a single vessel for containing the initial reaction zone and the carbamate decomposition zone, use of an inert liquid heat exchange medium circulated in the vessel for quick direct heat transfer or by indirect heat exchange, by rapid separation of gaseous decomposition products (ammonia, carbon dioxide, and water vapor) from the liquid reaction product in a stripping section of the decomposition zone where gas-liquid interface is increased. With this operation the gases from the decomposition zone and stripping section can be passed directly back to the urea synthesis zone rather than first to a separate absorber and subsequently to the synthesis zone.

The means and operation of the present invention will be explained with reference to the drawings.

FIGURE 1 shows a preferred system using hydrocarbon oil as a direct contact heat exchange fluid circulating from a reaction zone to a decomposition and stripping section and then back to the reaction zone.

FIGURE 2 shows a single vessel containing both the reaction zone and the decomposition and stripping zone, with the reaction zone having a heat exchange relation to a stripping section.

FIGURE 3 shows a dual vessel system using liquid metal as a direct contact heat exchange fluid circulating from reaction zone to decomposition and stripping zone, and then back to the reaction zone.

In these systems the heat transfer rate between the contents of the urea synthesis reactor and the contents of the carbamate decomposer is high so that the pressure can be made lower. The gases evolved in the carbamate decomposing zone where carbon dioxide acts as a gaseous stripping agent are passed directly under pressure into the urea synthesis reaction zone where they promote mixing and heat transfer and react. The reaction zone need be fed only with stoichiometric quantities of the reactants, thereby utilizing essentially all of the reactants. Thus, the synthesis reaction temperature may be 140° to 200° C., and is preferably lowered to the range of 160° to 180° C., the synthesis reaction pressure can be 100 to 300 atmospheres, and is preferably lowered to the range of 100 to 150 atmospheres; and the temperature in the carbamate decomposition zone may be maintained below 200° C., and is advantageously kept in the range of 140° to 160° C., with no loss of the rate of the synthesis and the decomposition reactions.

Referring to FIGURE 1, urea is formed by reaction of carbon dioxide with liquid ammonia under pressure in the reaction zone 4 occupying an upper section of vessel 5. This reaction is exothermic and produces a melt or magma containing urea, ammonium carbamate, water and some unreacted ammonia. The liquid ammonia is introduced near the bottom of the reaction zone 4 through a simple distributor and sparger 6.

A stream of stable petroleum oil, cooler and of lower density than the melt and immiscible with the melt is introduced near the bottom of the reaction zone from the riser pipe 7 shown to have a serrated bubble cap 8 at its outlet. This oil rises as distributed globules and helps to agitate the melt. As the oil rises, it absorbs heat released in the melt and increases in temperature. Suitable petroleum oils are paraffins, naphthenes, aromatic hydrocarbons and alkyl aromatic hydrocarbons boiling in the naphtha to gas oil range, e.g. 40° to 400° C., and having specific gravities in the range of 0.75 to 0.90.

The mixture of melt and the oil overflows from the top of the reaction zone 4 into a downcomer tube 9, in which a column of the mixture has sufficient pressure head to flow by gravity into the upper part of the decomposer-stripper section 10. This decomposer-stripper section may be located inside the vessel 5 and separated from the upper reaction zone by the partitioning member 11 in the form of a curved plate which is fitted with bubble caps 12.

In the decomposer-stripper section, a mixture of melt and oil leaves the bottom opening of the downcomer tube 9 to enter the liquid mixture on a top plate 13 having an overflow weir 14 and from this top plate the mixture flows down over other staggered plates or baffles 27 to be contacted by upflowing gaseous decomposition products and gaseous feed carbon dioxide, said feed carbon dioxide being introduced near the bottom of the vessel through inlet pipe 15. The oil and melt gravitate downwardly over the baffles in the form of a thin layer, such as froth, for increased contact between the gaseous phase and the liquid phase. This contacting serves to decompose the liquid carbamate back to carbon dioxide and ammonia, which are stripped from the melt, rise together with some of the water vapor and are passed to the bottom of the urea synthesis reaction zone through the bubble caps 12.

The hydrocarbon oil supplies the heat required in the carbamate decomposition reaction and becomes cooled.

At the bottom of the stripping section is provided a coalescing section 16 where the two phases coalesce. The oil phase and melt phases are separated by subsequent settling. The coalesced oil flows into a settling zone at the bottom of the vessel 10. The cooled oil collects as a separate upper liquid phase 17 in the settling zone. The top level of this upper phase can be maintained by controlling with the liquid level device 18 and this level is maintained above the bottom opening of the riser tube 7. Pressure in the decomposer-stripper section makes the oil flow up through the riser tube 7 to be returned to the bottom of the urea synthesis reaction zone. Other configurations could be used, and the hydraulic balance may dictate the need for a pump for the oil circulation.

Settled and stripped liquid melt forming the lower liquid phase 19 is removed as liquid effluent through the valved line 20, in which the valve 21 is controlled by a liquid level device 22.

The liquid product recovered from the decomposition and stripping contains urea, water, a small amount of carbon dioxide, slight amounts of ammonia depending upon the efficiency of stripping, and slight amounts of biuret. It is desirable to remove this effluent as quickly as possible to avoid side reactions such as hydrolysis of urea and biuret formation. Subsequent treatments such as degassing by simple flashing off of gases and other processing steps may involve crystallization, centrifugation and drying.

The amount of carbon dioxide evolved in the subsequent degassing is minor—about 4% on the urea contained—and the gas thus evolved may be discarded. This eliminates customary requirements for recycle gas compressors, absorbers, strippers, and pumps.

Mother liquor obtained from a crystallization step for the purification of urea may be recycled to the top of the reactor vessel 5. This mother liquor may be passed down through a small packed section 23 by being introduced through line 24. In passing down through the packing the recycle mother liquor can be used to absorb ammonia and carbon dioxide from a vent gas stream which leaves the top of the vessel 5 through a pressure control valve 25 and vent line 26. In this way, the vented gases are mainly such inert gas substances such as nitrogen, argon and methane which are thus purged without loss of reactants.

An alternative method for recovering reacting gas from the gases that are purged is to scrub the purge stream at a low pressure with recycle mother liquor, and then to pressure the mother liquor into the reactor.

Makeup petroleum oil, when needed, may also be added through line 24.

The process described can be carried out with the urea synthesis reaction zone and the decomposer-stripping zone in separate vessels instead of a single partitioned vessel as shown. The internal devices used for obtaining more interface contact of gases with liquid are typical of those used for gas-liquid contacting. More than a single oil and melt overflow tube may be used and more than a single riser tube may be used. The reaction zone may also be provided with additional heat exchange means such as a coil into which water is introduced and from which steam is generated. The coalescing section may contain a suitable packing, for example, a packing of Teflon in the form of Raschig rings. The interior of the vessel and the tubes are to be constructed of suitable metals which resist corrosion or they may have suitable linings.

In certain respects the essentially once-through process described above permits the use of a relatively low mole ratio of $NH_3/CO_2$ since the reactants are kept in the reaction zone and returned directly from the stripping zone to the reaction zone. The preferred mole ratio of $NH_3/CO_2$ used is near the stoichiometric ratio of 2/1. In carrying out the urea synthesis reaction with a nominal 20-minute residence time at 180° C., the pressure in the urea synthesis reaction zone may be lowered to 150 atmospheres and the pressure in the decomposer-stripping zone may be slightly higher, such as 5 to 15 p.s.i., depending upon the hydraulic balance established. Under such conditions the heat released in the synthesis reaction zone amounts to 40MM B.t.u./hr. for a plant producing 250 short tons per day of urea. With the present design, about 25MM B.t.u./hr. of the heat thus released is directly absorbed by the saturated oil and used in the decomposition of the ammonium carbamate. The remnants of the heat released can be transferred by indirect heat exchange to water in a coil placed within the reaction zone and used to generate steam.

Referring to FIGURE 2 the heat-integrated reactor-decomposer vessel 35 has an arrangement of a plurality of tubes 36 mounted at their discharge ends in a tube sheet 37 shown near the bottom of the vessel 35. The liquid ammonia feed is introduced into the melt surrounding the vertical tubes 36 through inlet pipe 38 into a simple sparger located near the bottom of the reaction zone. This method of introduction helps agitate the reaction melt. The exothermic reaction of the ammonia with carbon dioxide forms the melt containing urea, ammonium carbamate, water and some unreacted ammonia.

The melt overflows from the reaction zone into the upper openings of the tubes 36. While flowing down through the tubes, the melt, in the form of a frothy film, is contacted with an upwardly flowing stream of carbon dioxide feed which is introduced through line 40 into the bottom of vessel 35 in the free spaces below the tube sheet 37. This countercurrent flow of the carbon dioxide gas up through tubes 36 and the heat conducted through the tubes serve to decompose the ammonium carbamate in the melt so as to form carbon dioxide, ammonia and some water vapor. The liquid is stripped of gas and on reaching the bottom of the tubes 36 contains mainly urea along with some water and a minor amount of carbon dioxide.

The liquid effluent which drops from the bottom outlet of the tubes 36 falls into a sump 41 at the bottom of vessel 35. A minimal liquid holdup is controlled in the sump 41 by having the valve 42 in the drainpipe 43 controlled by a liquid level sensing device 44. The liquid urea solution withdrawn through line 43 may then be degassed by simple flash step and then sent through the usual finishing steps of crystallization, centrifugation and drying.

As indicated with reference to FIGURE 1, mother liquor from a crystallization step may be recycled to vessel 35 by being introduced through line 45 above a packing zone 46 through which inert gases are vented. The mother liquor can be used to reabsorb ammonia and carbon dioxide so that inert gases are purged through the valved line 47 without loss of reactants.

FIGURE 3 illustrates a design and operation of a heat integrated reactor-decomposer system for the synthesis of urea and decomposition of the ammonium carbamate which is formed during the synthesis of urea. This design utilizes liquids heavier than the urea melt, such as molten metal alloys which remain liquid under the conditions of operation to act as a direct contact heat exchange medium. The design additionally employs feed carbon dioxide as a stripping agent in the carbamate decomposition step and permits the stripping agent carrying the gaseous decomposition products, ammonia, carbon dioxide, and some water vapor, to be passed directly from the carbamate decomposition zone to the urea synthesis reaction zone.

Referring to FIGURE 3, urea is formed from carbon dioxide and ammonia at elevated pressure in the liquid phase, forming the melt contained in the reaction vessel 50. Said ammonia is introduced by means of a sparger 51 located near the bottom of the reaction zone in vessel 50. The molten metal or heavy liquid heat exchange medium is introduced from line 52 through a distributor 53 near the top of the vessel 50. Dispersed droplets of the heavy liquid medium gravitate downward through the melt phase and collect in a settling zone 54 at the bottom of the vessel 50 below the urea melt. During the downward movement, the heavier liquid medium picks up heat released in the urea synthesis reaction and increases in temperature.

The urea melt overflows near the top of the vessel 50 to be withdrawn by a side drawoff pipe 55 in which it flows by gravity to the top of the decomposer-stripper vessel 56 where the urea melt is contacted with an upwardly flowing stream of gaseous feed carbon dioxide. The gaseous carbon dioxide is introduced by pipe 57 at the bottom of vessel 56. The urea melt is made to flow down over staggered baffles 58 to increase the surface of the melt exposed to the carbon dioxide stripping agent and this contacting serves to decompose with ammonium carbamate in the melt back to carbon dioxide and ammonia, which gases are made to flow with the feed carbon dioxide from the upper part of vessel 56 by line 59 to near the bottom of the urea synthesis zone in vessel 50.

The heavy liquid is withdrawn from the settling zone at the bottom of vessel 50 by pipe 60 and is introduced near the top of the decomposer-stripper vessel 56. The heavy liquid is dispersed into the urea melt and gravitates downwardly together with the urea melt undergoing and being subjected to the ammonium carbamate decomposition conditions. The hot heavy liquid supplies the major part of the heat required in the decomposition reaction and becomes lower in temperature, and collects in a settling zone 61 at the bottom of vessel 56 under the residual urea product solution 62. From the settling zone 61, the cooled heavy liquid is withdrawn through line 63 and is conveyed by a pump 64 and by pipe 52 back to the top of the urea synthesis reaction vessel 50. An electromagnetic pump may be used for certain of the heavy liquid metals.

Internals of the stripper-decomposer may be typical of those used for gas-liquid reaction or contacting. The heavy liquid such as a molten metal settles rapidly. Urea solution is removed as quickly as possible from layer 62 through line 65. This urea solution contains principally urea, water, a small amount of carbon dioxide and little or no ammonia depending on the efficiency of stripping. This solution may then be passed to a simple flash zone for degassing and then sent to the usual finishing steps which may involve crystallization, centrifugation and drying.

Inert gas which passes up through the melt in vessel 50 may be made to pass up through a packed absorption section 70. Mother liquor recycled from a crystallization step may be introduced at above the packing by line 71 to absorb ammonia and carbon dioxide from a vent gas which is removed through a valved control.

A number of metals and metal alloys, which are inert toward the reactants, intermediates, and products in the system (as well as to the materials of construction employed) and which are in the liquid phase at the temperatures used, e.g. 150° to 180° C., may be employed as the heavy liquid heat transfer medium. Elemental indium and gallium may be used. Alloys of gallium, indium, bismuth, cadmium and lead may also be employed, e.g., an alloy containing 68% Cd, 31.5% Bi and 0.5% Pb; an alloy of Ga and In, preferably containing less than 90 wt. percent of indium, an alloy of Bi containing In, preferably containing between 30 and 80 wt. percent indium.

The process described can be carried out with the separate vessels as shown or in a single vessel having means for passing the melt down through a decomposition and stripping section countercurrently with gaseous carbon dioxide feed.

What is claimed is:

1. In the process of synthesizing urea from reaction of ammonia with gaseous carbon dioxide under pressure in the range of 100 to 300 atmospheres, at a temperature in the range of 140° to 200° C. and at a residence time of 5 to 60 minutes to form a urea melt which contains the urea, water and ammonium carbamate in a urea synthesis reaction zone and subsequently decomposing said ammonium carbamate in a decomposing and stripping zone, the improvement steps which comprise:
   (a) flowing the urea melt from the synthesis reaction zone down through said decomposing and stripping zone;
   (b) transferring most of the heat evolved in the synthesis reaction zone to the urea melt flowing down through the decomposing and stripping zone, thereby controlling the temperature in said synthesis reaction zone;
   (c) contacting the urea melt with a countercurrent stream of gaseous $CO_2$ to cause decomposition of the carbamate and to strip $CO_2$ and $NH_3$ gas released by decomposition of the carbamate;
   (d) passing the countercurrent stream of carbon dioxide carrying ammonia and water vapor from the decomposition and stripping zone into the urea synthesis reaction zone wherein the carbon dioxide reacts and consumes ammonia feed to form additional urea melt; and
   (e) maintaining the decomposition and stripping zone at essentially the same pressure as the pressure in the synthesis reaction zone.

2. In the process of claim 1, flowing the melt through the decomposition and stripping zone as a thin layer of froth for quicker heat and mass transfer.

3. In the process of claim 1, passing a cool hydrocarbon oil up through the urea melt in the synthesis zone to absorb heat, then passing the thus heated hydrocarbon oil down through the decomposing and stripping zone in contact with the urea melt to impart heat to said urea melt and cool said hydrocarbon oil, then separating the hydrocarbon oil from the urea and returning the resulting cooled hydrocarbon oil to the synthesis zone.

4. In the process of claim 1, maintaining a pressure in the decomposing and stripping zone to make gas flow therefrom into the urea synthesis reaction zone while melt flows by gravity from an upper part thereof into an upper part of the decomposing and stripping zone.

5. In the process of claim 1, passing a cool liquid heat exchange medium through the urea melt in the synthesis zone to absorb heat, passing the heated liquid heat exchange medium down through the decomposition and stripping zone in contact with the urea melt to impart heat to said urea melt and cool said heat exchange medium, then separating the liquid heat exchange medium from the urea and returning the resulating cooled heat exchange medium to the synthesis zone as said cool medium.

6. In the process of claim 1, passing the gases arising from the decomposition and stripping zone into the bottom part of the urea synthesis reaction zone, thereby providing intimate contact with and agitation of the reactants.

References Cited

UNITED STATES PATENTS 3,356,723    12/1967    Kaasenbrood _____ 260—555

HENRY R. JILES, *Primary Examiner.*